United States Patent
Nakanishi

(10) Patent No.: US 10,829,301 B2
(45) Date of Patent: Nov. 10, 2020

(54) TRANSPORT DEVICE

(71) Applicant: Murata Machinery, Ltd., Kyoto (JP)

(72) Inventor: Yuichi Nakanishi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 184 days.

(21) Appl. No.: 16/183,003

(22) Filed: Nov. 7, 2018

(65) Prior Publication Data

US 2019/0135538 A1 May 9, 2019

(30) Foreign Application Priority Data

Nov. 7, 2017 (JP) ................................. 2017-214449

(51) Int. Cl.
*G06F 7/00* (2006.01)
*B65G 1/04* (2006.01)

(52) U.S. Cl.
CPC ...... *B65G 1/0421* (2013.01); *B65G 2203/041* (2013.01)

(58) Field of Classification Search
None
See application file for complete search history.

(56) References Cited

U.S. PATENT DOCUMENTS

| 5,327,354 A | * | 7/1994 | Tsujimoto | G06Q 10/08 700/226 |
| 2008/0167817 A1 | * | 7/2008 | Hessler | G01C 21/005 701/514 |
| 2013/0207811 A1 | * | 8/2013 | Yagawa | B65G 1/0421 340/691.6 |
| 2014/0037405 A1 | * | 2/2014 | Li | B65G 1/06 414/273 |
| 2018/0120465 A1 | * | 5/2018 | Rose | B66F 9/063 |

FOREIGN PATENT DOCUMENTS

| JP | 5-37713 U | 5/1993 |
| JP | 2003-54707 A | 2/2003 |
| JP | 2006-111415 A | 4/2006 |

* cited by examiner

*Primary Examiner* — Yolanda R Cumbess
(74) *Attorney, Agent, or Firm* — DLA Piper LLP (US)

(57) ABSTRACT

A stacker crane includes a transferring device, a first camera, a second camera, and a system controller. The transferring device transfers the article W to and from the shelf. The first camera and the second camera are provided on the transferring device and are fixed at positions where the first and second cameras can capture images of end parts of the article placed on the transferring device in a front-rear direction which is at least a transferring direction of the article and a transfer destination shelf on the end part side in the front-rear direction. Based on detection results of the first camera and the second camera, the system controller identifies the presence or absence of an article on the transfer destination shelf and determines the article-state abnormality of the article placed on the transferring device.

5 Claims, 9 Drawing Sheets

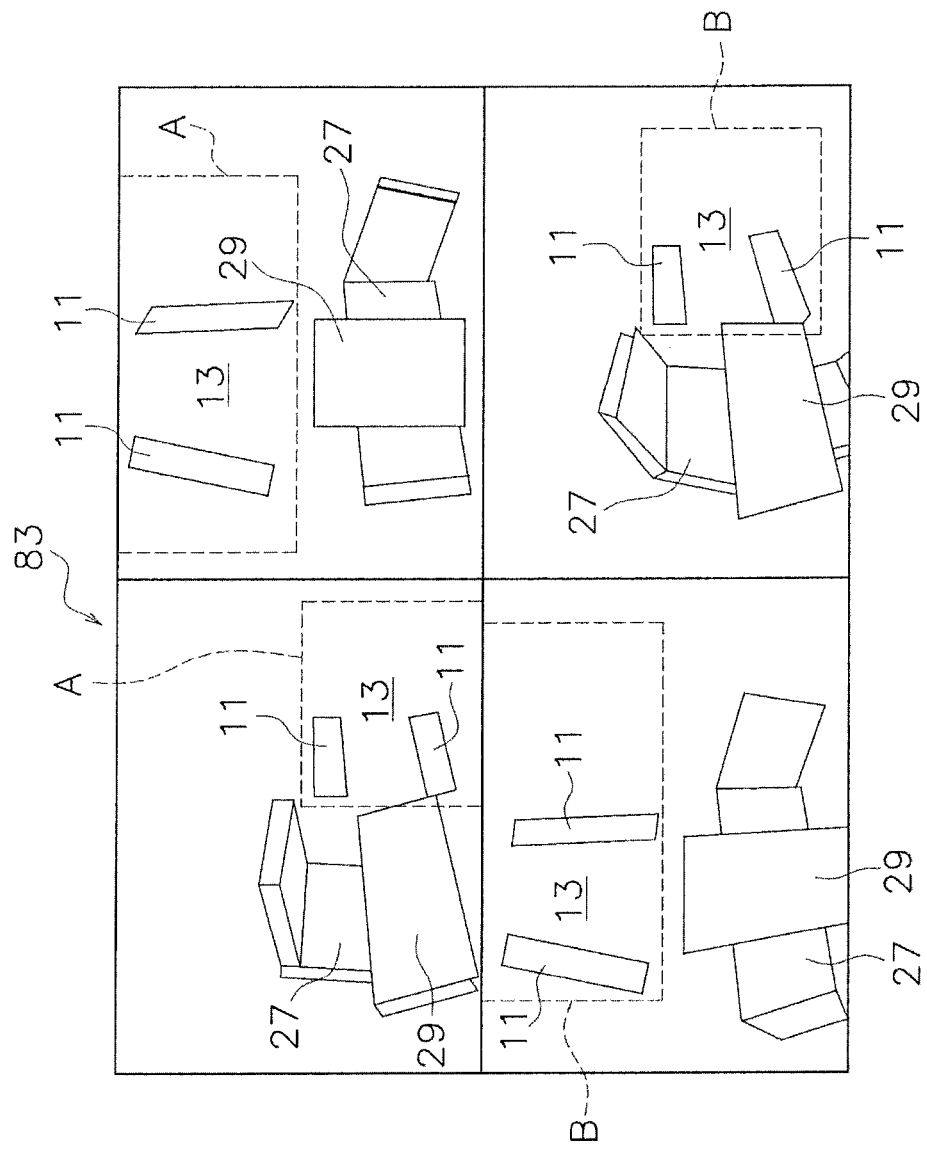

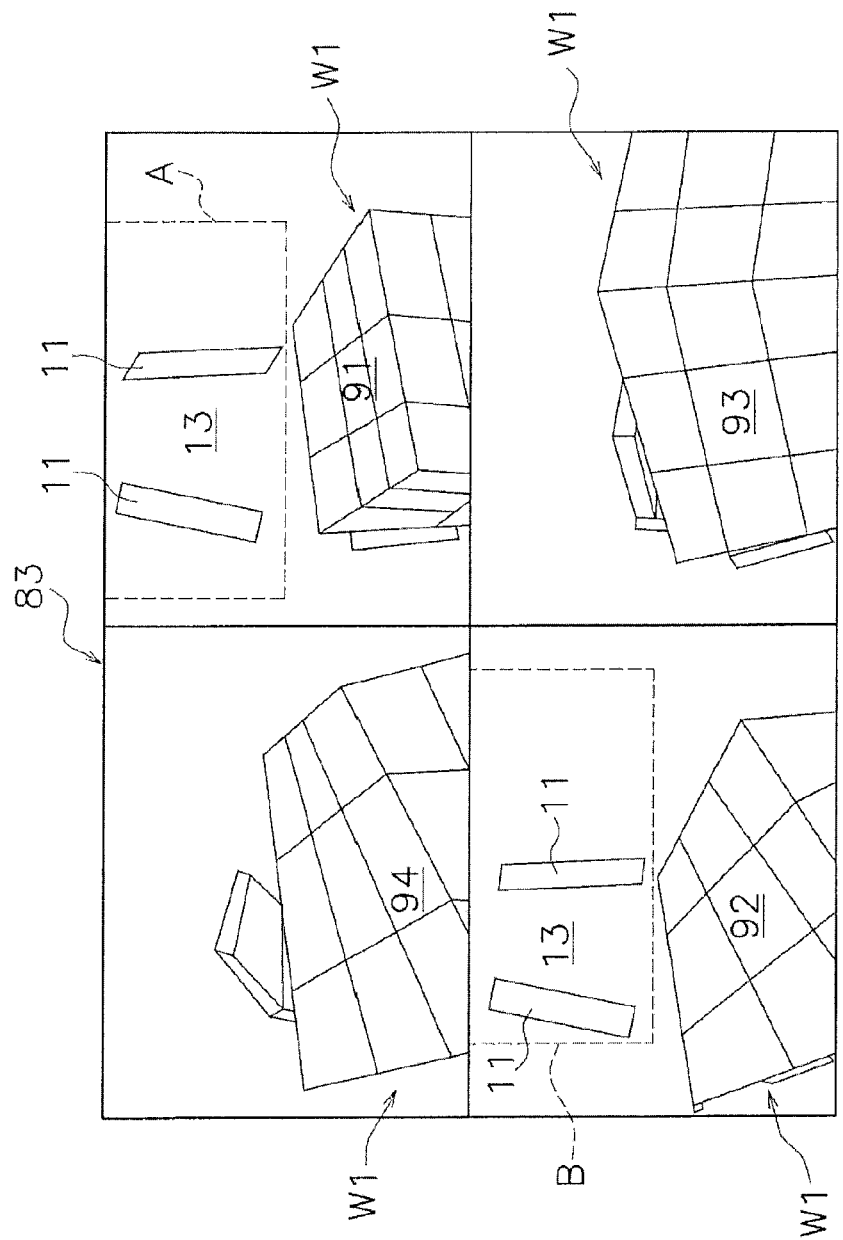

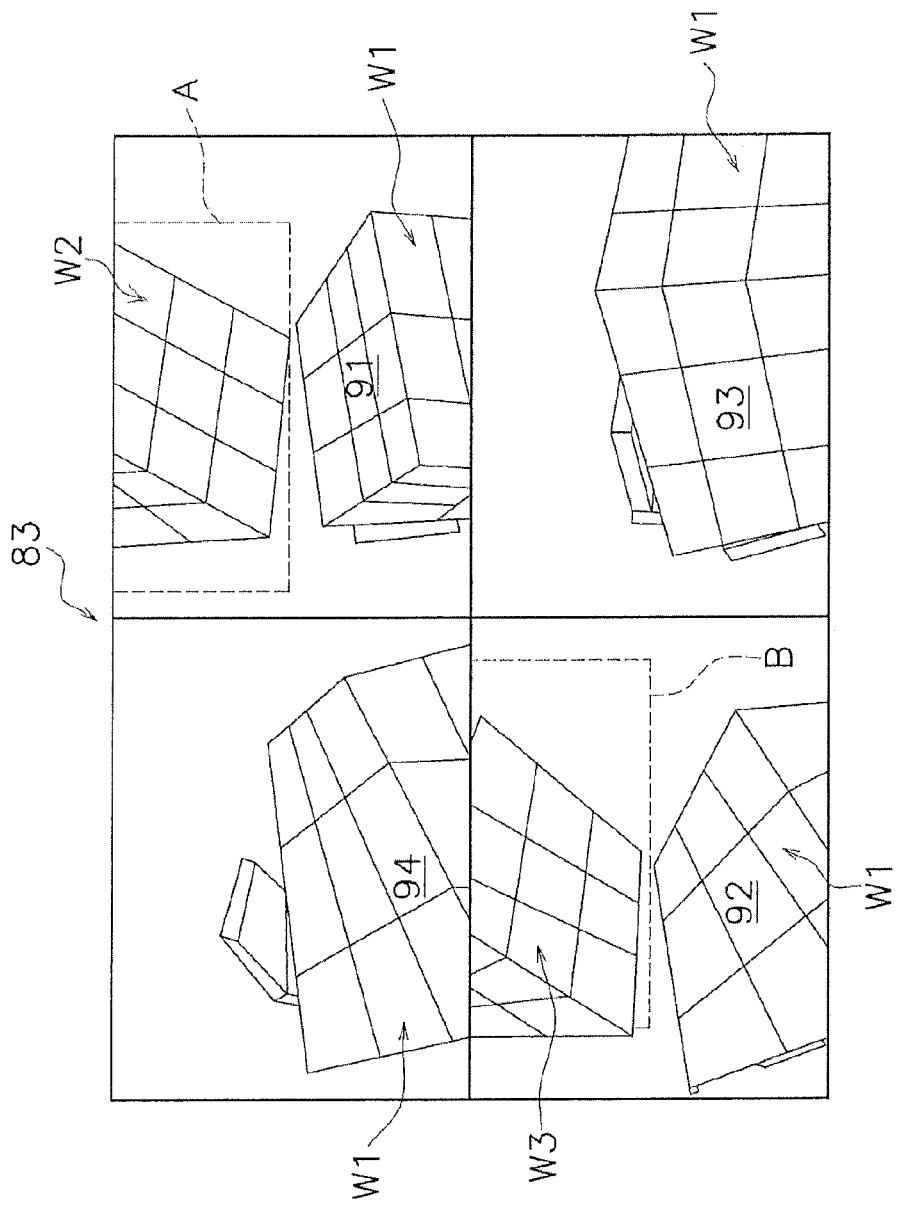

TRANSPORT DEVICE

TECHNICAL FIELD

This disclosure relates to a transport device, particularly a transport device including a camera capable of detecting a state of an article.

BACKGROUND

A conventional automated storage is provided with, for example, a pair of racks, a stacker crane, a warehousing station, and a delivery station. The pair of racks has a predetermined space therebetween in a front-rear direction. The stacker crane is provided in a movable manner between the front and rear racks in the horizontal direction. The warehousing station is located on a side of one rack. The delivery station is located on a side of the other rack. The rack has a large number of shelves vertically and horizontally.

When an article is placed at the warehousing station, the stacker crane loads the article and then transports the article to a target shelf. During loading, the article placed on a platform may cause an article-state abnormality (including article collapse and article displacement) in some cases. Therefore, the stacker crane is provided with a sensor to detect the article collapse and the article displacement of the article placed on the platform (e.g., see Japanese Utility Model Application No. H5-37713).

In Japanese Utility Model Application No. H5-37713, four cameras are provided on a platform for article-state detection.

Meanwhile, it may occur that data stored in a computer of the automated storage indicates a different state from an actual warehousing state. An example of this situation is that, even though data indicates no article in a shelf, an article is actually placed on the shelf. Such a situation occurs, for example, when an operator places an article from a fork of the stacker crane onto an empty shelf and then forgets to return the article to the fork. Thus, on a certain shelf, there is no article according to the data, but an article is placed in actuality. So, if another article is transferred to the shelf from the stacker crane, the articles might contact and damage each other.

There is known, for example, an article storage device including an article placement part, a transferring device, and a sensor provided in the transferring device, the sensor detecting presence or absence of an article on the article placement part. The sensor is disposed to emit light in a substantially horizontal direction. The sensor emits light toward a place of the article placement part on which the article is placed, checks the presence or absence of light reflected from the article, and determines whether or not the article is placed on the article placement part. The transferring device does not transfer the article to the article placement part when the sensor receives the reflected light. Such a case is called a pre-placed article abnormality.

However, if the sensor is provided for each purpose as described above, the number of sensors increases to cause a cost increase.

Therefore, it is helpful to provide a way to perform both article-state abnormality detection and pre-placed article detection in a transport device with a simple configuration.

SUMMARY

This disclosure provides a transport device having a transferring device, a first imaging unit, and a controller.

The transferring device transfers an article to and from a shelf.

The first imaging unit is provided on the transferring device and fixed at a position where the first imaging unit is capable of simultaneously capturing images of an end part of the article placed on the transferring device in a first direction which is at least a transferring direction of the article and a transfer destination shelf on the end part side in the first direction.

Based on a detection result of the first imaging unit, the controller identifies the presence or absence of an article on the transfer destination shelf and determines an article-state abnormality of the article placed on the transferring device. The article-state abnormality includes article protrusion (an article protruding from a reference area) and article collapse. Further, the article-state abnormality includes not only when the article changes in orientation but also when a part of the article is deformed, for example.

In this transport device, by providing the imaging unit at a position where the imaging unit can simultaneously perform both article-state abnormality detection and a pre-placed article detection, both of the detections can be performed by one imaging unit. That is, provision of the imaging unit for each application is unnecessary.

In the transferring device, the first imaging unit may be fixed above an upper end of the article placed on the transferring device and outside the article in the first direction.

In this transport device, by capturing an image of the end part of the article from above, an article-state abnormality can be detected irrespective of a height of the article.

The transferring device may be capable of transferring the article to and from the shelf on each side in the first direction.

The first imaging unit may be provided on each side of the transferring device in the first direction.

In this transport device, by providing the imaging unit on each side in the first direction of the transferring device, it is possible to detect an article-state abnormality and a pre-placed article in both transferring directions.

The transport device may further include a second imaging unit. The second imaging unit may be provided in the transferring device and fixed above the upper end of the article placed on the transferring device and outside the article in the second direction orthogonal to the first direction.

In the transferring device, the first imaging unit may be fixed above an upper end of the article placed on the transferring device and outside the article in the first direction.

The first imaging unit may include a pair of the first imaging units provided on both sides of the transferring device in the first direction, and the pair of first imaging units may be provided to be located on both sides of the transferring device in the second direction. The second imaging unit may include a pair of the second imaging units provided on both sides of the transferring device in the second direction, and the pair of second imaging units may be located on both sides of the transferring device in the first direction. The first imaging unit and the second imaging unit may be arranged to capture images while making one round in one direction in a plan view.

In this transport device, by the plurality of imaging units capturing images to make one round in one direction, an image processing target can be set at the same position within an imaging range in each imaging unit (e.g., an image processing range concerning an article-state abnormality can be set in a lower area of each video). Therefore, uniform image processing can be performed on each camera image.

The controller may identify the presence or absence of the article on the transfer destination, based on whether or not the transfer destination shelf has been detected in a detection result of the first imaging unit.

In this transport device, there is no need to provide special parts or marks to determine the presence or absence of the article on the transfer destination, thereby simplifying the configuration of the shelves.

It is possible in the transport device to perform both the article-state abnormality detection and the pre-placed article detection with a simple configuration.

BRIEF DESCRIPTION OF THE DRAWINGS

FIG. 7 is a display screen illustrating one state of the transferring device and shelves.

FIG. 8 is a display screen illustrating one state of the transferring device and shelves.

FIG. 9 is a display screen illustrating one state of the transferring device and shelves.

DETAILED DESCRIPTION

1. First Example (1) Whole Automated Storage

Figure 1:
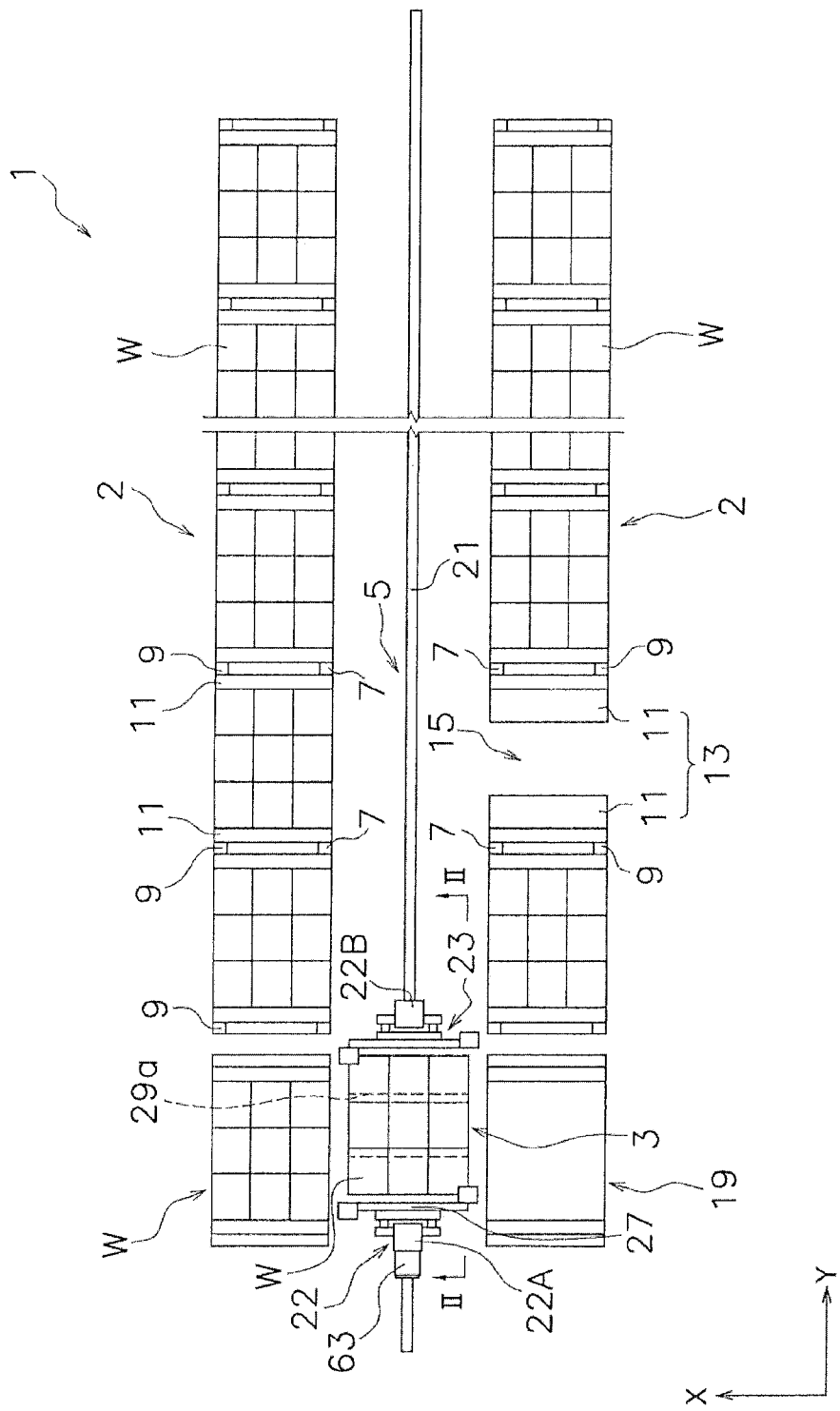
FIG. 1 is a schematic plan view of an automated storage having adopted a first example.

With reference to FIG. 1, an automated storage 1 as a first example will be described. FIG. 1 is a schematic plan view of an automated storage having adopted the first example. In this example, a horizontal direction in FIG. 1 is a horizontal direction of the automated storage 1 (an example of a second direction, an arrow Y), and a longitudinal direction in FIG. 1 is a front-rear direction of the automated storage 1 (an example of a first direction, an arrow X).

The automated storage 1 mainly includes a pair of racks 2 and a stacker crane 3 (an example of a transport device).

(2) Racks

The pair of racks 2 are arranged to sandwich a stacker crane passage 5 extending in the horizontal direction. The rack 2 includes a large number of front side support columns 7 arranged at predetermined intervals in the horizontal direction, rear side support columns 9 arranged behind the front side support columns 7 at predetermined intervals from the front side support columns 7, and a large number of article support members 11 provided between the front side support columns 7 and the rear side support columns 9. A pair of right and left article support members 11 constitutes a shelf 13. As clearly illustrated in the figure, an article W can be placed on each shelf 13. Each article W is placed on a pallet P (cf. FIGS. 2 and 3) and moves together with the pallet P. A space between the pair of right and left article support members 11 is a fork passing gap 15 that allows vertical movement of a slide fork 29a described later.

(3) Stacker Crane

Figure 2:
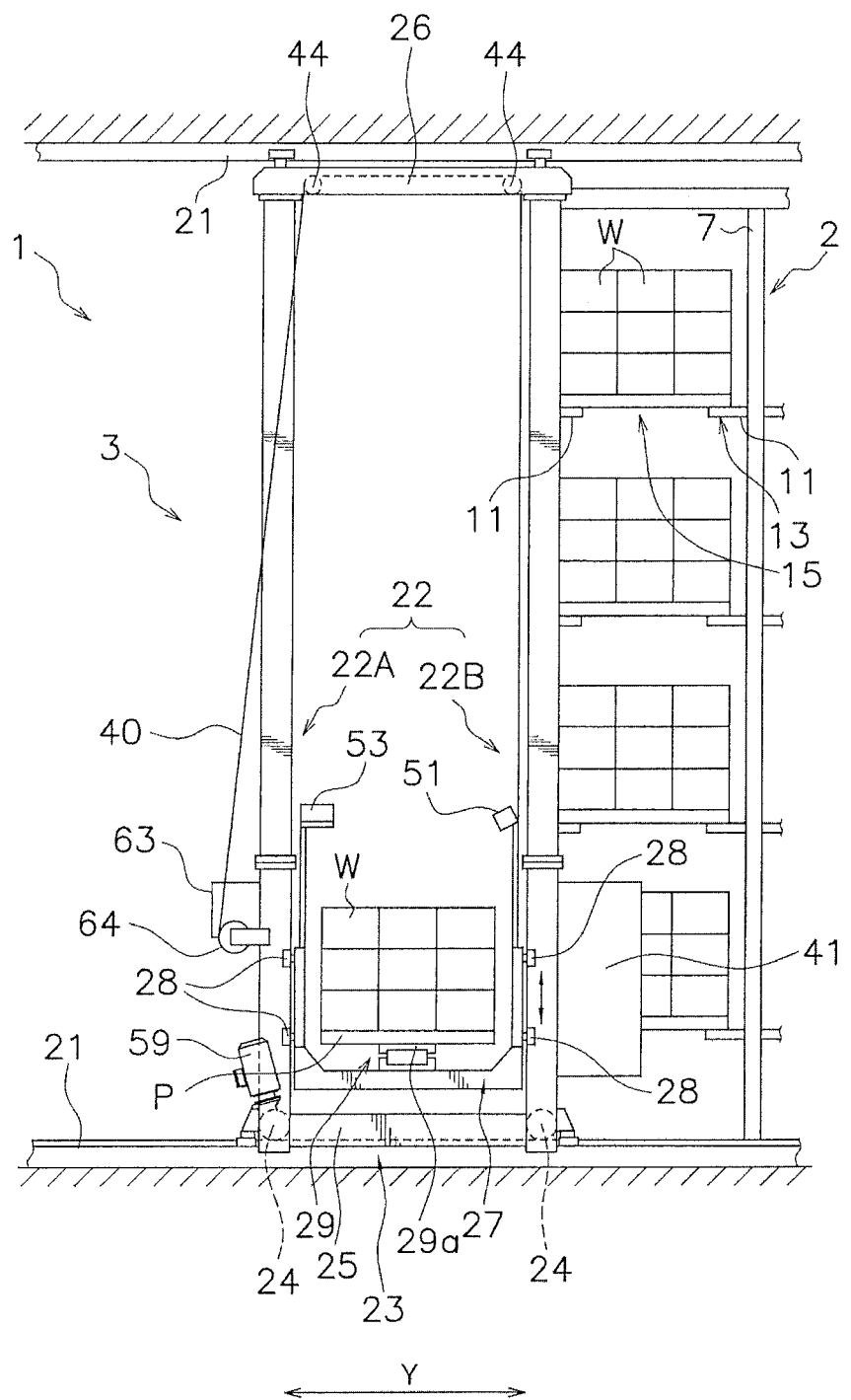
FIG. 2 is a view taken in an arrow direction of II-II in FIG. 1, to explain a rack and a stacker crane.

With reference to FIG. 2, the stacker crane 3 will be described. FIG. 2 is a view taken in an arrow direction of II-II in FIG. 1 to illustrate the rack and the stacker crane.

A pair of upper and lower travelling rails 21 are provided along the stacker crane passage 5, and the stacker crane 3 is guided along the travelling rails 21 in a movable manner in the horizontal direction. The stacker crane 3 mainly includes a travelling vehicle 23 having a first mast 22A and a second mast 22B that are a pair of masts 22, a platform 27 provided to be movable up and down on the first mast 22A and the second mast 22B, and a transferring device 29 provided on the platform 27. The travelling vehicle 23 includes travelling wheels 24.

The transferring device 29 has a slide fork 29a provided to be slidable in the front-rear direction by an advance and retreat mechanism (not illustrated). The slide fork 29a is capable of transferring the article W to and from the shelves 13 on both sides in the front-rear direction.

The platform 27 and the transferring device 29 are fixed to each other, and a part of the platform 27 may be regarded as a part of the transferring device 29.

The platform 27 has elevating guide rollers 28 guided by the first mast 22A and the second mast 22B. An upper one pair and a lower one pair, a total of four, of elevating guide rollers 28 are in contact with one mast. More specifically, the pair of elevating guide rollers 28 is in contact with an inner side portions in the travelling direction on both side surfaces of the mast 22 in the front-rear direction.

In FIG. 2, the pallet P and the article W are placed on the slide fork 29a of the platform 27. In this example, the article W has a configuration where three rectangular parallelepipeds each in the three directions (3×3×3) are stacked without gaps. However, the number, shapes, and a stacking method of individual packages of the article W are not limited to the above example.

Lower ends of the first mast 22A and the second mast 22B are coupled by a lower frame 25, and upper ends of the first mast 22A and the second mast 22B are coupled by an upper frame 26.

The stacker crane 3 includes a control panel 41, a travelling motor 59, and an elevating motor 63. The control panel 41 is provided on an opposite side from the first mast 22A in the travelling direction with respect to the second mast 22B. The travelling motor 59 is provided on the first mast 22A. The elevating motor 63 is provided on the first mast 22A.

The control panel 41 includes therein electric equipment such as an inverter, a converter, and a breaker for the travelling motor 59 and the elevating motor 63. Further, the control panel 41 includes a control board box (not illustrated). The control panel 41 includes a frame that covers the electrical equipment. The control panel 41 connects to a power source (not illustrated), a travelling motor 59, an elevating motor 63, a slide fork 29a, and the like via a power cable (not illustrated). Further, the control panel 41 connects to a ground control panel, sensors, the slide fork 29a, and a control power source via a control interface via a communication interface.

As illustrated in FIG. 2, the elevating motor 63 can drive the drum 64. A wire 40 extends from the drum 64. The wire 40 is wrapped around a pulley 44 provided on the upper frame 26 and further coupled to the platform 27.

Figure 3:
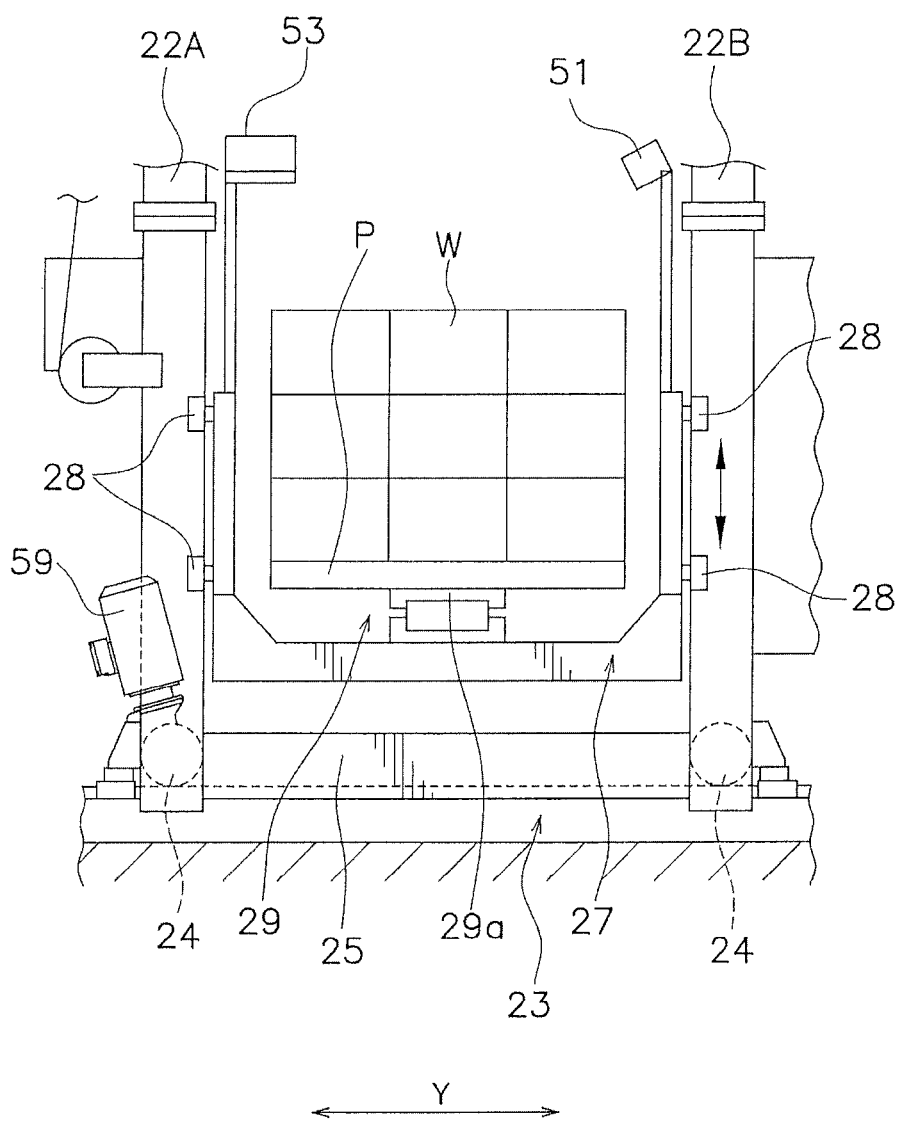
FIG. 3 is an enlarged view of FIG. 2, illustrating a configuration of the stacker crane.
Figure 4:
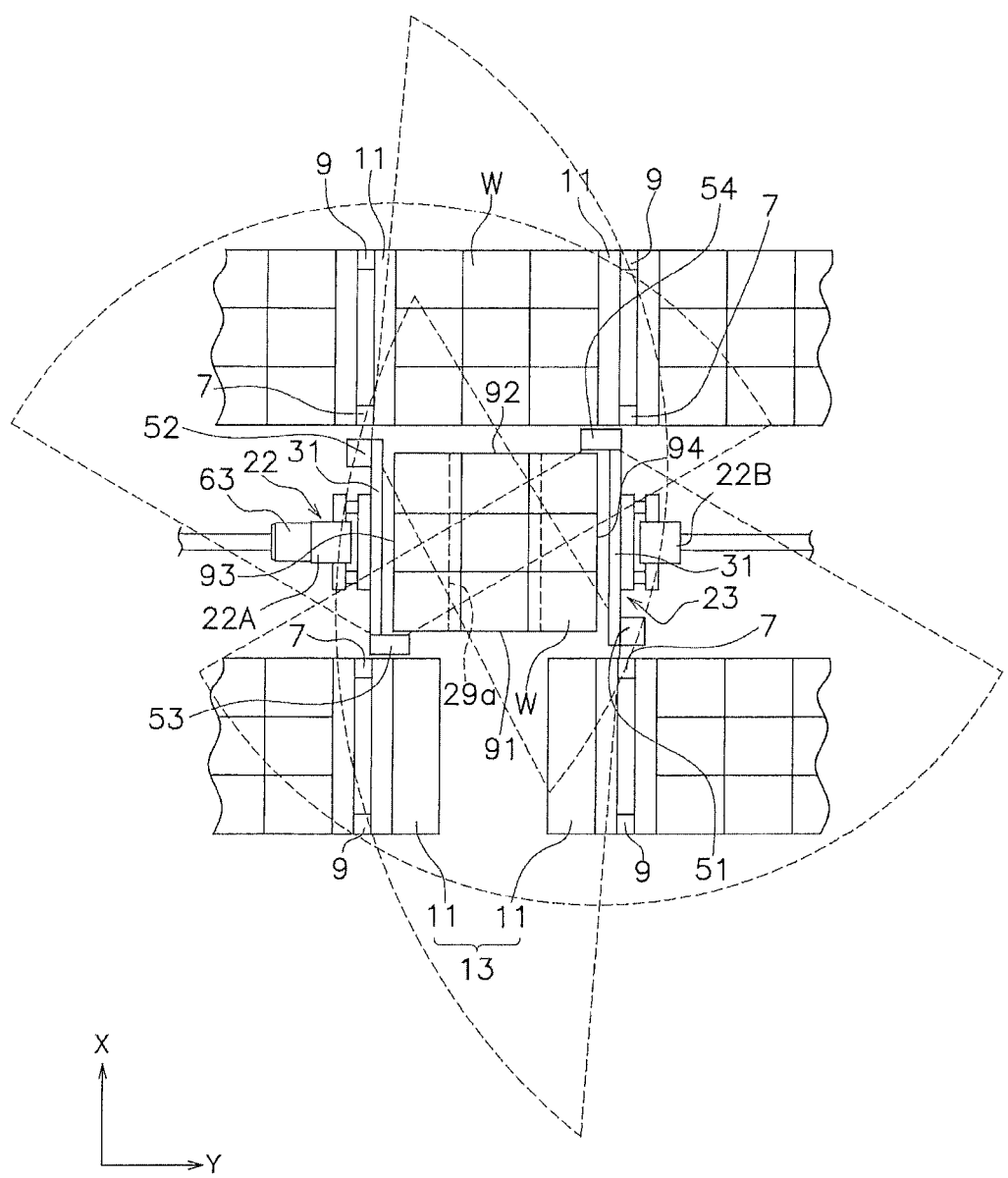
FIG. 4 is a schematic plan view schematically illustrating arrangement positions and imaging ranges of cameras.

As illustrated in FIGS. 2 to 4, the transferring device 29 is equipped with a first camera 51, a second camera 52, a third camera 53, and a fourth camera 54 (hereinafter referred to as "four cameras 51 to 54" when represented collectively). FIG. 4 is a plan view schematically illustrating arrangement positions and imaging ranges of the cameras. The four cameras 51 to 54 are so-called video cameras, and input captured images (still images and moving images) as video signals into the system controller 71. In the above example, the imaging ranges of the first camera 51 and the second camera 52 are different from the imaging ranges of the third camera 53 and the fourth camera 54. However, the imaging ranges of the four cameras may be different from each other, or may be all the same.

The four cameras 51 to 54 are devices that capture images of the article W placed on the platform 27 and the article W placed on the shelf 13.

As illustrated in FIG. 4, the four cameras 51 to 54 are attached to the platform 27 via frames 31. The frames 31 are a pair of members extending in the front-rear direction on both sides of the platform 27 or the transferring device 29 of the horizontal direction. The four cameras 51 to 54 are fixed to both ends of the each frame 31 in the front-rear direction. The camera may be attached to other members except for the frames.

The first camera 51 and the second camera 52 (examples of the first imaging unit) are fixed at positions where the first and second cameras 51, 52 can simultaneously capture images of end parts (i.e., end faces) of the article W in the front-rear direction (an example of the first direction) and the transfer destination shelf 13 on the end side in the front-rear direction.

The first camera 51 and the second camera 52 are provided in the transferring device 29 above an upper end of the article W placed on the transferring device 29 and outside the article W in the horizontal direction. The first camera 51 and the second camera 52 are directed obliquely downward. In this case, by the camera capturing an image of the article from above, article collapse can be detected regardless of the height of the article W.

As described above, the first camera 51 and the second camera 52 are provided on both sides of the transferring device 29 in the front-rear direction. It is thus possible to detect article-state abnormality of the article W placed on the transferring device 29 and pre-placed article in both transferring directions.

With reference to FIG. 4, the first camera 51 and the second camera 52 will be described in detail.

The first camera 51 is provided on a lower right side of FIG. 4 in a plan view. The first camera 51 is provided at a position where the first camera 51 can simultaneously capture images of an end part 91 in the front-rear direction of the article W stacked on the transferring device 29 and the transfer destination shelf 13 on the end part 91 side in the front-rear direction. Even when the article W is disposed on the transferring device 29, the first camera 51 can detect the pre-placed article on the transfer destination shelf 13. This is because, when seen from the first camera 51, the placement position of the transferring device 29 and the transfer destination shelf 13 are shifted in the front-rear direction.

The second camera 52 is provided on an upper left side of FIG. 4. The second camera 52 is provided at a position where the second camera 52 can simultaneously capture images of an end part 92 in the front-rear direction of the article W stacked on the transferring device 29 and the transfer destination shelf 13 on the end part 92 side in the front-rear direction. Even when the article W is disposed on the transferring device 29, the second camera 52 can detect the pre-placed article on the transfer destination shelf 13. This is because, when seen from the second camera 52, the placement position of the transferring device 29 and the transfer destination shelf 13 are shifted in the front-rear direction.

The shelf 13 targeted by the first camera 51 and the shelf 13 targeted by the second camera are different shelves.

The third camera 53 and the fourth camera 54 (examples of the second imaging unit) are provided on the transferring device 29 and at positions where the third and fourth cameras 53, 54 can capture images of end parts (i.e., end faces) of the article W in the horizontal direction (an example of the second direction), the article W being placed on the transferring device 29.

The third camera 53 and the fourth camera 54 are provided in the transferring device 29 above the upper end of the article W placed on the transferring device 29 and outside the article W in the front-rear direction. The third camera 53 and the fourth camera 54 are directed obliquely downward.

The third camera 53 and the fourth camera 54 will be described in detail with reference to FIG. 4.

The third camera 53 is provided on a lower left side of FIG. 4. The third camera 53 is provided at a position where the third camera 53 can capture an image of an end part 93 in the horizontal direction of the article W stacked on the transferring device 29. When the article W is not placed on the transferring device 29, the third camera 53 can detect the pre-placed article on the transfer destination shelf 13, but when the article W is placed on the transferring device 29, the third camera 53 cannot detect the pre-placed article on the transfer destination shelf 13. This is because, when seen from the third camera 53, the placement position of the transferring device 29 and the transfer destination shelf 13 overlap each other.

The fourth camera 54 is provided on an upper right side of FIG. 4. The fourth camera 54 is provided at a position where the fourth camera 54 can capture an image of an end part 94 in the horizontal direction of the article W stacked on the transferring device 29. When the article W is not placed on the transferring device 29, the fourth camera 54 can detect the pre-placed article on the transfer destination shelf 13, but when the article W is placed on the transferring device 29, the fourth camera cannot detect the pre-placed article on the transfer destination shelf 13. This is because, when seen from the fourth camera 54, the placement position of the transferring device 29 and the transfer destination shelf 13 overlap each other.

The shelf 13 targeted by the third camera 53 and the shelf 13 targeted by the fourth camera are different shelves.

The four cameras 51 to 54 are arranged to capture images while making one round in one direction in a plan view. Specifically, in FIG. 4, the imaging directions of the four cameras 51 to 54 are clockwise in a plan view.

(4) Control Structure of Stacker Crane

Figure 5:
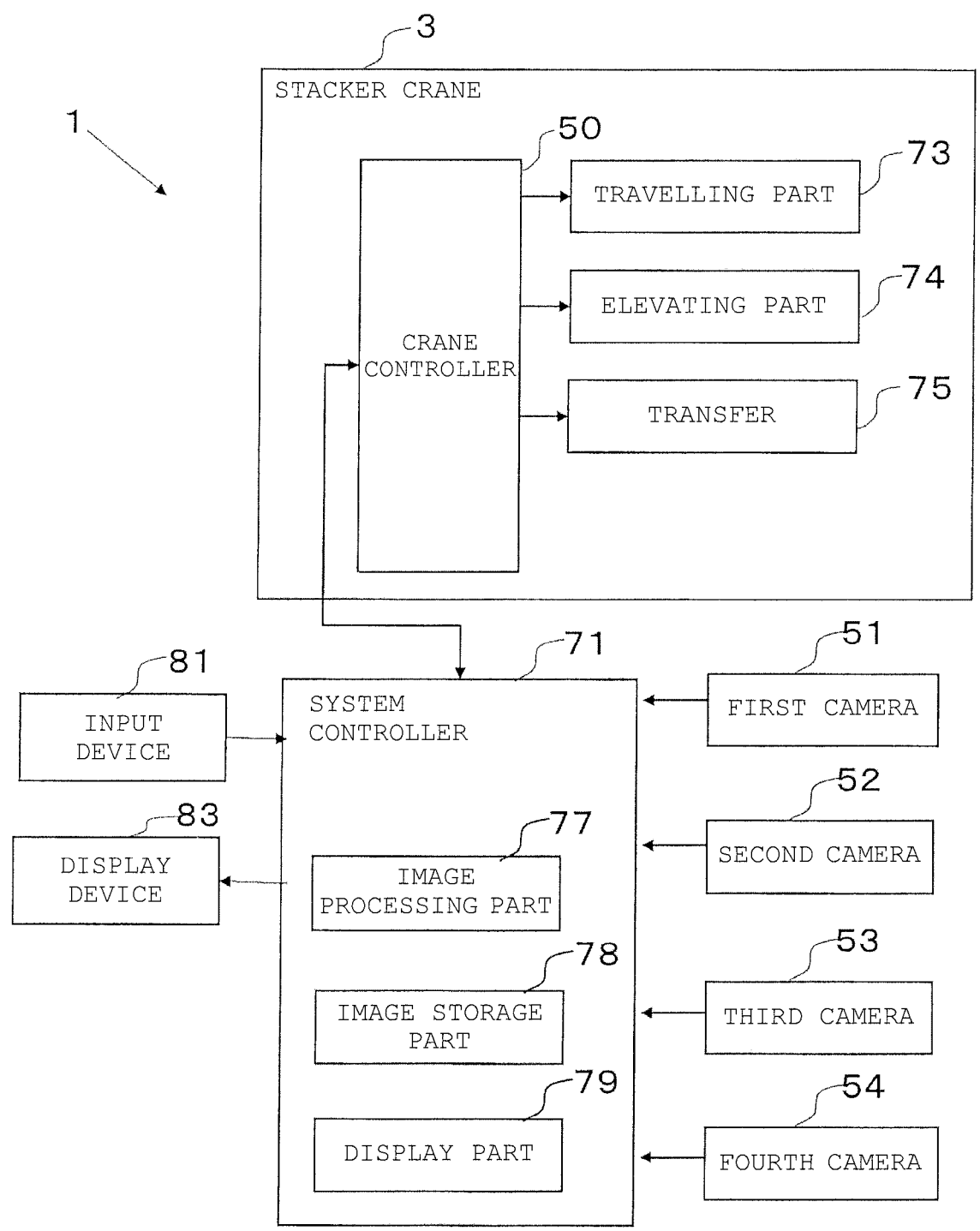
FIG. 5 is a functional block diagram of a control part of the stacker crane.

With reference to FIG. 5, a crane controller 50 disposed in a control board box (not illustrated) will be described. FIG. 5 is a functional block diagram of a control part of the stacker crane.

The crane controller 50 is mounted in the stacker crane 3 and is capable of communicating with a system controller 71 that controls the entire automated storage 1.

The crane controller 50 is a computer including computer hardware such as a CPU and a memory and, in FIG. 5, the crane controller 50 is represented as a functional block achieved by cooperation of computer hardware and software. These control parts may be achieved by respective single computers.

Each functional block may be made up of hardware. Further, the crane controller 50 is not limited to the one mounted on the travelling vehicle 23, and may be disposed on a ground side in an electrically connected state.

The crane controller 50 has a function to control driving of travelling wheels 24 of the travelling vehicle 23 and connects to a travelling part 73 including the travelling motor 59. The crane controller 50 has a function to vertically move the platform 27 along the first mast 22A and the second mast 22B, and connects to an elevating part 74 including the elevating motor 63. The crane controller 50 has a function to move the slide fork 29a in the front-rear direction, and connects to a transfer part 75 including a transfer motor (not illustrated).

The system controller 71 is a computer including computer hardware such as a central processing unit (CPU) and a memory. The system controller 71 may be a general personal computer or a portable information terminal.

The four cameras 51 to 54 connect to the system controller 71. The system controller 71 has a function to control imaging of the four cameras 51 to 54. Further, the system controller 71 has an image processing part 77 made up of image processing solution software for image processing. The above function may be achieved by another device outside the system controller 71.

The four cameras 51 to 54 may connect to the crane controller 50. Further, the crane controller 50 may have the image processing part 77 and an image storage part 78.

The system controller 71 is provided with the image storage part 78. Into the image storage part 78, image data captured by each of the four cameras 51 to 54 is stored. The above function may be achieved by an image server outside the system controller 71.

The system controller 71 has a display part 79 that outputs an image to a display device 83 (described later).

To the system controller 71, an input device 81 and the display device 83 are connected.

The input device 81 is a device with which an operator inputs data and commands to the system controller 71. The input device 81 is, for example, a keyboard, a mouse, or a touch panel. The input device 81 may be another computer connected via a network, for example.

The display device 83 is a display such as liquid crystal or an organic electroluminescence (EL). However, a type of the display, the number of displays, and an installation position of the display are not limited to the above example.

(5) Control Operation

In the stacker crane 3 configured as described above, the stacker crane 3 moves the transferring device 29 to the front of the transfer destination shelf 13, and before unloading is performed, images of a state on the platform 27 and a state of the transfer destination shelf 13 are captured by the four cameras 51 to 54. Specifically, the imaging data is stored into the image storage part 78. By performing image processing on the imaging data, determination is made on whether an article-state abnormality has occurred in the article W placed on the transferring device 29 and on the presence or absence of the pre-placed article on the transfer destination shelf 13.

Figure 6:
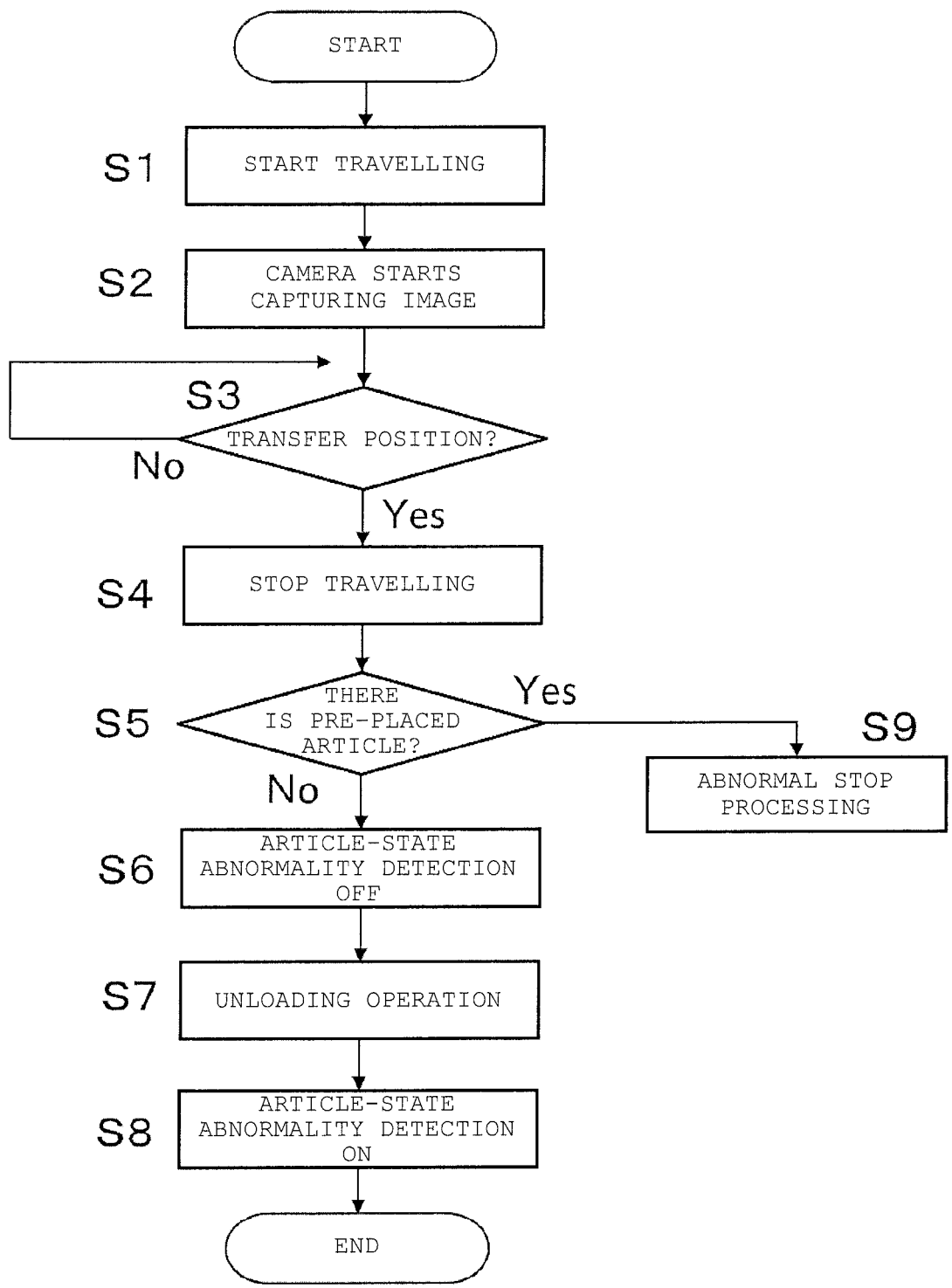
FIG. 6 is a flowchart illustrating an abnormal state detection control operation before unloading.

With reference to FIG. 6, abnormal state detection control before unloading will be described. FIG. 6 is a flowchart illustrating an abnormal state detection control operation before unloading.

The control flowchart described below is an example, and each step can be omitted and replaced as necessary. Further, a plurality of steps may be simultaneously executed, or some or all of the steps may be executed in an overlapping manner.

Moreover, each block of the control flowchart is not limited to a single control operation, but can be replaced with a plurality of control operations represented by a plurality of blocks.

An operation of each device is a result of a command from the control part to each device, and the operation is represented by each step of software/application.

In step S1 of FIG. 6, first, the transferring device 29 on which the article W is stacked starts travelling. Specifically, the crane controller 50 controls the travelling part 73 to execute the above operation based on a transfer command from a host controller (not illustrated).

In step S2, imaging of the article W by each of the four cameras 51 to 54 is started. The imaging data is stored into the image storage part 78, for example. Specifically, the system controller 71 operates each of the four cameras 51 to 54 to capture, for example, a still image. As a result, article-state abnormality detection is turned on. Capturing an image of a still image may be executed by a command from the crane controller 50.

The article-state abnormality detection is always in the on-state except when the unloading operation to be described later is performed, and the image processing part 77 performs image processing on a video and determines whether or not the article-state abnormality (article collapse, article protrusion or the like) has occurred in an article placed on the transferring device 29. Specifically, the system controller 71 compares the article W and the reference area on which the article W is to be placed, based on the imaging information captured by each of the four cameras 51 to 54, to determine the article collapse and the article protrusion.

There are, for example, two ways of determining an abnormal place as follows. In a first method, an abnormality is assumed when there is a movement of an object which goes beyond (going out of) the reference area. In a second method, an initial state of an area outside the reference area is stored, and the initial state and the current state are compared to detect an abnormality. The article collapse and the article deformation may be detected by image processing when there is a change in shape of the article.

When there is an abnormality, abnormal stop processing is performed.

In step S3, it is determined whether or not the transferring device 29 has reached the transfer position in front of the transfer destination shelf 13. Specifically, the crane controller 50 makes the above determination based on a detection signal from a sensor (not illustrated). When the transferring device 29 reaches the transfer position ("Yes" in step S3), the processing proceeds to step S4.

In step S4, the transferring device 29 is stopped. Specifically, the crane controller 50 controls the travelling part 73 to execute the above operation.

In step S5, the image processing part 77 of the system controller 71 performs image processing to determine whether or not there is a pre-placed article on the unloading destination shelf 13. When there is not a pre-placed article ("No" in step S5), the processing proceeds to step S6. When there is a pre-placed article ("Yes" in step S5), the processing proceeds to step S9. In step S9, abnormality stop processing is performed.

For example, there are two types as types of the pre-placed article detection.

First, by looking at a linear pattern in the image, the article support member 11 is detected. Since the article support member 11 does not appear in the image when the pre-placed article is placed, it is determined as follows: when the article support member 11 can be seen means that there is no pre-placed article; and when the article support member 11 cannot be seen means that there is a pre-placed article.

Second, by learning of the image with the pre-placed article and the image without the pre-placed article, the presence or absence of the pre-placed article is determined from the image before transfer.

In step S6, the article-state abnormality detection is turned off.

In step S7, unloading operation is performed. Specifically, the crane controller 50 controls the transfer part 75. As a result, the slide fork 29a of the transferring device 29 transfers the article W to the shelf 13.

In step S8, the article-state abnormality detection is turned on.

As described above, based on the detection results of the first camera 51 and the second camera 52, the system controller 71 identifies the presence or absence of the article W on the transfer destination and determines the article collapse of the article W placed on the transferring device 29. Therefore, by providing the camera at a position where both the article collapse detection and the pre-placed article detection can be performed, both of the detections can be performed with a small number of cameras. That is, it is not necessary to provide a sensor for each application.

As described above, the system controller 71 identifies the presence or absence of the article W on the transfer destination shelf 13 based on whether or not a member constituting the transfer destination shelf 13 has been detected in the detection results of the first camera 51 and the second camera 52. It is thus unnecessary to provide special parts or marks to determine the presence or absence of the article W, thereby simplifying the configuration.

Examples of videos of the four cameras 51 to 54 will be described with reference to FIGS. 7 to 9. FIGS. 7 to 9 are display screens each illustrating one state of the transferring device and shelves.

In FIGS. 7 to 9, on the screen of the display device 83, videos captured by the four cameras 51 to 54 are displayed. The upper right portion of each figure is an image captured by the first camera 51. The lower left portion is an image captured by the second camera 52. The lower right portion is an image captured by the third camera 53. The upper left portion is an image captured by the fourth camera 54.

In FIG. 7, the article W is not placed on the transferring device 29. The article W is not placed on the shelves 13 on both sides in the front-rear direction, either. Therefore, all the images show the article support members 11 of the shelf 13. Note that a portion surrounded by a broken line A is one shelf 13 and a portion surrounded by a broken line B is the other shelf.

In FIG. 8, an article W1 is placed on the transferring device 29. The article W is not placed on the shelves 13 on both sides in the front-rear direction (i.e., there is no pre-placed article). In this case, the state of the end part 91 of the article W1 can be checked using the image of the first camera 51. The state of the end part 92 of the article W1 can be checked using the image of the second camera 52. The state of the end part 93 of the article W1 can be checked using the image of the third camera 53. The state of the end part 94 of the article W1 can be checked using the image of the fourth camera 54.

Further, in FIG. 8, the image of the first camera 51 and the image of the second camera 52 show the article support members 11 of the shelf 13. Therefore, the system controller 71 can identify that the article W is not placed on the shelves 13 on both sides in the front-rear direction. However, in this case, the image of the third camera 53 or the image of the fourth camera 54 does not show the state of the shelf 13.

In FIG. 9, an article W1 is placed on the transferring device 29. Also, an article W2 and an article W3 are placed on the shelves 13 on both sides in the front-rear direction (i.e., there is a pre-placed article). Therefore, the presence of the article W2 and the state of the end part 91 of the article W1 can be checked using the image of the first camera 51. The presence of the article W3 and the end part 92 of the article W1 can be checked using the image of the second camera 52. The state of the end part 93 of the article W1 can be checked using the image of the third camera 53. The state of the end part 94 of the article W1 can be checked using the image of the fourth camera 54.

Further, in FIG. 9, the image of the first camera 51 or the image of the second camera 52 does not show the article support member 11 of the shelf 13. Therefore, the system controller 71 can identify that the article W2 and the article W3 are placed on the shelves 13 on both sides in the front-rear direction. However, in this case, the image of the third camera 53 or the image of the fourth camera 54 does not show the state of the shelf 13.

In addition, the four cameras 51 to 54 are arranged such that the imaging direction is one round in one direction in a plan view. Specifically, the first camera 51 and the second camera 52 are provided as the first imaging units on both sides of the transferring device 29 in the horizontal direction. The third camera 53 and the fourth camera 54 are provided as the second imaging units on both sides of the transferring device 29 in the horizontal direction. Note that the first camera 51 and the second camera 52 are arranged apart from each other on both sides of the transferring device 29 in the front-rear direction. The third camera 53 and the fourth camera 54 are arranged apart from each other on both sides of the transferring device 29 in the front-rear direction.

Therefore, by capturing images to make one round in one direction, an image processing target can be set at the same position within an imaging range in each of the four cameras 51 to 54 (e.g., an image processing range concerning the article-state abnormality can be set in a lower area of each video). Therefore, uniform image processing can be performed on each camera image.

Specifically, as apparent from FIGS. 7 to 9, the end parts 91 to 94 (i.e., the end faces) of the article W placed on the transferring device 29 are located in lower portions of the respective videos. The system controller 71 can thus determine the article-state abnormality of the article W placed on the transferring device 29 by performing image processing only on the lower portion of the video.

2. Characteristics of Example

The above example can be described as follows.

The stacker crane 3 (an example of the transport device) includes the transferring device 29 (an example of the transferring device), the first camera 51 and the second camera 52 (examples of the first imaging unit), and the system controller 71 (an example of the controller).

The transferring device 29 transfers the article W to and from the shelf 13.

The first camera 51 and the second camera 52 are provided on the transferring device 29 and fixed at positions where the first and second cameras 51, 52 can simultaneously capture images of end parts 91, 92 (examples of the end part) of the article W placed on the transferring device 29 in the front-rear direction (one example of the first direction), which is at least the transferring direction of the article W, and the transfer destination shelf 13 on the end part side in the front-rear direction.

Based on detection results of the first camera 51 and the second camera 52, the system controller 71 identifies the presence or absence of an article W on the transfer destination shelf 13 and determines the article-state abnormality of the article W placed on the transferring device 29.

In this stacker crane 3, by providing the first camera 51 and the second camera 52 at positions where both the article-state abnormality detection and the pre-placed article detection can be performed, both of the detections can be performed by one camera. That is, it is not necessary to provide a camera for each application.

3. Other Examples

Although one example has been described above, this disclosure is not limited to the above example, and a variety of changes can be made in a range not deviating from the spirit of the disclosure. In particular, the plurality of examples and alternative examples described herein can be combined in a freely selected manner as required.

In the first example, the transport device has been the stacker crane, but the type of transport device is not limited. For example, the transport device may be a shuttle bogie travelling on each level of the racks in the storage. In addition, the transport device may be a tracked vehicle that travels along rails on the ground or the ceiling.

In the first example, the transferring device can transfer the articles to and from the shelves on both sides in the front-rear direction, but the transferring device may transfer the article only to the shelf on one side in the front-rear direction.

In the first example, the transferring device has been the slide fork, but the type of transferring device is not limited. For example, the transferring device may be a side arm type (rear hook, clamp, side hook).

In the first example, the still image has been adopted as the captured image data of the article, but a moving image may be adopted.

In the first example, the article has been placed on the pallet, but the article may be housed in a tray container.

The number of cameras is not particularly limited. The number of cameras may be one to three or may be five or more.

Images captured by all cameras may not be simultaneously displayed on the display device. For example, only an image captured by one camera may be displayed and made switchable.

The shape of the article is not particularly limited. For example, the article may not have four end faces.

For three cameras, the following setting is possible. For example, the first camera and the second camera are provided apart from both sides of the transferring device in the front-rear direction and are provided at the same position (one side) in the horizontal direction.

The first camera and the second camera detect a pre-placed article and detect one article-state abnormality in the horizontal direction. The third camera is provided to detect the other article-state abnormality in the horizontal direction.

In the above example, the imaging direction of the camera has been set to make one round in one direction, but the configuration may be different. For example, the arrangement positions of the four cameras 51 to 54 are the same as the arrangement positions currently described, and the first camera 51 and the third camera 53 are installed to face each other, and the pre-placed article detection is performed using a left-side imaging range of the first camera 51 and a right-side imaging range of the third camera 53. This also applies to the relationship between the second camera 52 and the fourth camera 54.

Further, the first camera 51 and the fourth camera 54 detect one of the article-state abnormalities in the horizontal direction.

My transport devices can be widely applied to a transport device including a camera capable of detecting a state of an article.

What is claimed is:

1. A transport device comprising:
    a travelling part,
    a transferring device mounted on the travelling part that transfers an article to and from a transfer destination shelf;
    a first imaging unit provided on the transferring device, the first imaging unit is fixed at a position on the transferring device to be capable of simultaneously capturing an image of: at least an end part of an article placed on the transferring device in a first direction and a transfer destination shelf on the end part side in the first direction, wherein the first direction is a transferring direction of the article; and
    a controller that identifies presence or absence of an article on the transfer destination shelf and determines an article-state abnormality of the article placed on the transferring device, based on a detection result of the first imaging unit.

2. The transport device according to claim 1, wherein the first imaging unit is fixed to the transferring device at a position above an upper end of the article placed on the transferring device and outside the article in the first direction.

3. The transport device according to claim 1, wherein
    the transferring device is capable of transferring the article to and from a second shelf on an opposing side of the transferring device in the first direction, and
    the first imaging unit is provided on two opposing sides of the transferring device in the first direction.

4. The transport device according to claim 1, further comprising
    a second imaging unit provided in the transferring device and fixed to the transferring device at a position above an upper end of the article placed on the transferring device and outside the article in a second direction orthogonal to the first direction,
    wherein
    the first imaging unit is fixed to the transferring device at a position above the upper end of the article placed on the transferring device and outside the article in the first direction, and
    the first imaging unit includes a pair of the first imaging units provided on two parallel and opposing sides of the transferring device in the first direction, and the pair of first imaging units are located on two parallel sides in the second direction,
    the second imaging unit includes a pair of the second imaging units provided on two parallel sides of the transferring device in the second direction, and the pair of second imaging units are located on two parallel sides in the first direction, and
    the first imaging unit and the second imaging unit are arranged to capture images in one direction while making one round in a plan view.

5. The transport device according to claim 1, wherein the controller identifies the presence or absence of the article on the transfer destination, based on whether the transfer destination shelf has been detected in the detection result of the first imaging unit.

\* \* \* \* \*